Sept. 26, 1967 J. F. BUTTERFIELD 3,343,453
SOUND REPRODUCTION MEANS HAVING APPARATUS
FOR PRODUCING FORMS AND
COLORS IN MOTION Original Filed Aug. 1, 1960 2 Sheets-Sheet 1

INVENTOR.
JAMES F. BUTTERFIELD

BY Warren T. Jessup

ATTORNEY

Sept. 26, 1967  J. F. BUTTERFIELD  3,343,453
SOUND REPRODUCTION MEANS HAVING APPARATUS
FOR PRODUCING FORMS AND
COLORS IN MOTION
Original Filed Aug. 1, 1960  2 Sheets-Sheet 2
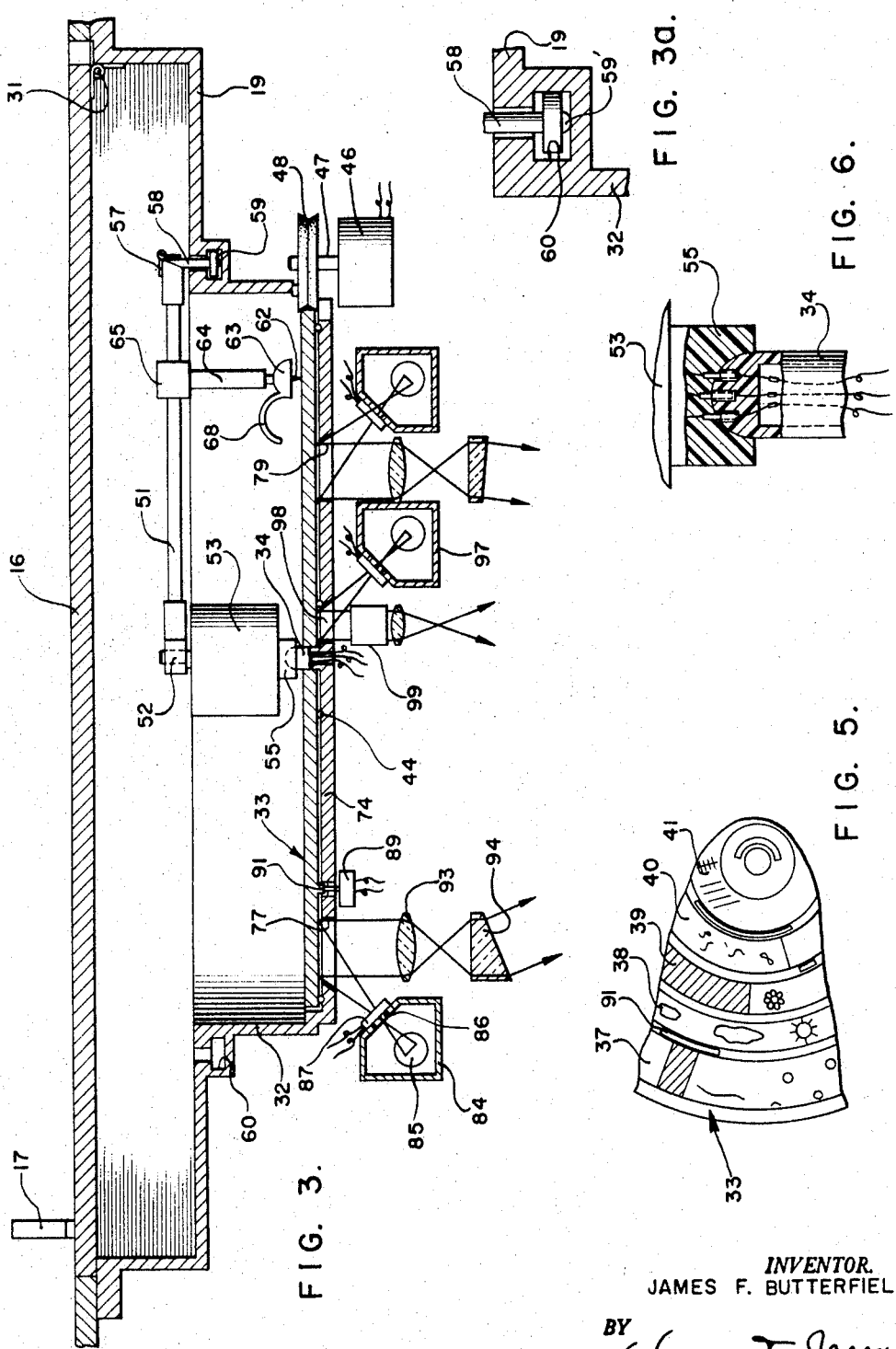
INVENTOR.
JAMES F. BUTTERFIELD
BY Warren T. Jessup
ATTORNEY United States Patent Office 3,343,453
Patented Sept. 26, 1967

3,343,453
SOUND REPRODUCTION MEANS HAVING APPARATUS FOR PRODUCING FORMS AND COLORS IN MOTION
James F. Butterfield, North Hollywood, Calif., assignor to James F. Butterfield and Edward Levitt, both of North Hollywood, Calif., a co-partnership
Original application Aug. 1, 1960, Ser. No. 46,726 now Patent No. 3,122,966, dated Mar. 3, 1964. Divided and this application Dec. 11, 1963, Ser. No. 336,091
4 Claims. (Cl. 88—27)

This is a division of co-pending application Ser. No. 46,726, filed Aug. 1, 1960, now Patent Number 3,122,966.

This invention relates to a novel art form for combining musical and other sounds and color or color patterns or images in motion, and further the displaying of the color or color patterns, etc. on a screen in synchronized accompaniment to the music. A primary object of the invention is to make available this novel art form and further to provide the means for effectively and simply practicing the art form, and providing it and making it available for general utilization in the fields of entertainment and education.

The herein invention will be best understood from the detailed description of a preferred embodiment thereof described herein. However, a preliminary understanding should be had of the general nature of the new art form of the invention. In a preferred form of the invention it is practiced by way of a phonograph record from which music is played while simultaneously in accompaniment to the music, compositions of moving, or more precisely, continuing and progressing color forms and/or patterns or images are projected on a screen. During the playing of the music, continuing or progressive moving color forms or patterns or other images are displayed on the screen and further these patterns and/or images, etc. may progress across the screen from left to right or from right to left; or they may progress from the top to the bottom or from the bottom up. They may do this singly or simultaneously. Color patterns or other images may be projected onto the screen from several sources and superimposed on the screen so that the continuous or progressive motion may be transpiring simultaneously on the screen in several directions. Turning the patterns on and off can create animation and other effects. The patterns and/or images may be displayed in various shapes and forms as well as in various colors although the display may also be in black and white with innumerable shadings in between. It is to be seen therefore that the new art form provides for infinite and innumerable variations and varieties of colored displays, types of motion, and combinations of patterns, forms and motions on the display screen.

In addition to the foregoing, various types of backgrounds moving progressively may be provided on the screen in combination with other foreground patterns or images with innumerable variations being possible in the nature of the relative progressive movement as between them. The displays projected in the manner described, of course are not limited to arbitrary or abstract patterns or designs but may include actual photographs, pictures, and the like of known forms such as mountains, clouds, etc. or geometric figures and of course words may similarly be displayed as well.

In a preferred form of the invention the color patterns or moving forms, images, or photographs or the like are projected onto a viewing screen from separate circular image bands or tracks provided on the bottom side of a phonograph record having a sound track on the top side. The bands or tracks carrying the colors, color patterns, or other images move past windows through which the images passing the windows are transmitted to the viewing screen with the images from a plurality of sources, i.e. a plurality of tracks superimposed on each other on the screen.

From the foregoing the general nature of the new art form will be understood as well as the general nature of the preferred means for practicing the new art form. The primary object is to make available the new art form in simplified and effective means whereby it may be enjoyed by private individuals as well as the public at large.

Another object is to provide an art form constituted by a visual means for interpreting music and sounds, i.e. to enable a composer to score color records as described above in accordance with known musical compositions so that the music and its interpetation in color can be played and displayed simultaneously.

Another object is to provide a means for effectuating the art form as described above comprising a phonograph record means and a player including a record having color patterns or other images inscribed in color bands or tracks on one side thereof combined with optical means for transmitting and displaying on a screen simultaneously, superimposed images from a plurality of said tracks.

A further object is to provide a means as in the foregoing including an additional image band or track and kaleidoscopic means of transmitting and for displaying kaleidoscopic images on said screen from said track.

Another object of this invention is to provide a means of public showings such as in theatres, night clubs, and other public places and for use as backgrounds in movies, and television.

Further objects and numerous of the advantages of the invention will become apparent from the following detailed description and annexed drawings constituting a disclosure in detail of a preferred embodiment of the invention. In the ensuing description, FIG. 1 is a perspective schematic view of a cabinet embodying an apparatus in accordance with the herein invention;

FIG. 3 is a schematic sectional view through the cabinet showing the record holding well and the mechanism of the invention in more detail;

FIG. 3a is a detail view of a part of FIG. 3;

FIG. 5 is a partial view of the lower side of the record showing the image bands or track; and FIG. 6 is a detail view of the record spindle which is also an electrical plug.

Figure 1:
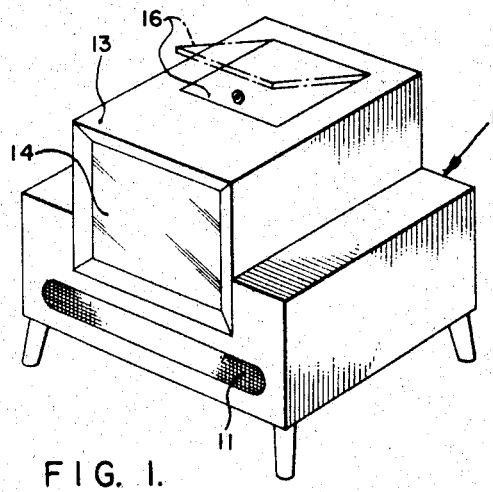

Referring now in more detail to the drawings, the apparatus of the invention may be embodied in a cabinet such as that shown at 10 in FIG. 1 having a base portion with legs as shown, there being two speakers within the lower part of the cabinet, one of which is indicated at 11. The upper part of the cabinet 13 is of slightly smaller dimensions and within it is housed the record playing mechanism and the optical part of the system. Numeral 14 designates a translucent display screen at the front of the cabinet. At the top of the part 13 is a hinged panel 16 having a ring 17 (FIG. 2) by which it may be lifted to give access to the record playing mechanism of the apparatus.

Figure 2:
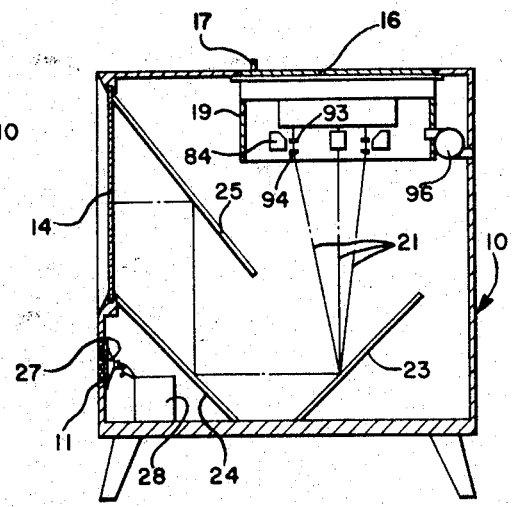
FIG. 2 is a sectional view through the cabinet of FIG. 1.

Referring to FIG. 2, the mechanical parts of the apparatus are within a housing 19 which is underneath the panel 16 and which is shown more in detail in FIG. 3. Moving patterns, color forms, or other images, are projected or reflected along the lines as shown at 21 to a mirror 23 extending at an angle from the bottom of the cabinet 10. The images are in turn reflected to another mirror 24 positioned at an angle and then to a third mirror 25 from which the images are reflected to the translucent screen 14 upon which they may be observed. One of the speaker cones is shown at 27 connected to an amplifier 28, which equipment may be of conventional type.

Referring now more in detail to FIG. 3 of the drawings, the housing 19 is directly below the panel 16 which is hinged as shown at 31. This housing has a downwardly extending well 32 in it, the record playing mechanism being in this well. Numeral 33 designates a record having a sound track on its top side and having a central opening received on a spindle 34. The record 33 can be removed from the well by placing thumbs in slots under the record. The record has on its bottom side a plurality of color, color patterns, or image bands designated at 37, 38, 39, 40, and 41 in FIG. 5. These bands are spaced apart as will be described more in detail presently.

The record 33 is mounted to rotate on a plurality of support rollers as indicated by way of example at 44 interposed between the record and the bottom of the well 32. The record 33 itself is driven by an electrical record motor 46 having a shaft 47 on which is a grooved friction wheel 48 which engages the periphery of the record 33. The record motor 46 drives the record 33 by way of example at approximately 1/10 revolution per minute.

Numeral 51 designates a needle arm mounted on the shaft 52 of phonomotor 53. The needle arm 51 is rotated by the phonomotor 53 at a conventional speed which may be, for example, approximately 33 1/3 revolutions per minute. The lower end 55 of the phonomotor engages the record spindle 34 which is also an electrical plug through which are carried the electrical leads for the phonomotor 53 and those connecting to the needle.

FIGURE 6 shows the spindle 34 which as stated is also an electrical plug, more in detail. This figure shows the manner in which the electrical leads are carried through the spindle 34 to the part 55 of the phonomotor housing to provide electrical connections to this motor and to the phonograph needle.

The arm 51 is hinged at 57 to a vertical stem or shaft 58 on the end of which is a roller 59. The hinge 57 permits the phonomotor and needle arm 51 to be lifted, that is rotated about the hinge to permit the placing of the record on the spindle 34. The roller or wheel 59 rotates in a guide track 60 which is a continuous circular track formed around the upper part of the well 32 as shown. FIG. 3a shows the details. Numeral 59' designates a button on the end of stem 58 which rides on the bottom of tracks 60.

The needle 62 extends from pick-up head 63 on the end of pick-up arm 64. Pick up arm 64 extends from a sliding block 65 which is mounted to slide radially on the arm 51. Numeral 68 designates a lift on the pick up head 63 used to place the needle in the desired groove. The pick-up head 63 and needle 62 ride up and down in the pick-up arm 64.

From the foregoing it will be observed that the record 33 rotates relatively slowly making only 1 revolution per playing of 10 minutes, whereas the arm 51 with the needle 62 rotates at substantially a normal speed for playing a record in the usual manner making 333 revolutions in 10 minutes. In this manner both sides of the record playing concurrently provide 10 minutes of color music. The relatively slow actual speed of the record is related to the reflection, transmission, and display of the images on the track or bands 37 to 41 as will be described more in detail presently.

Figure 4:
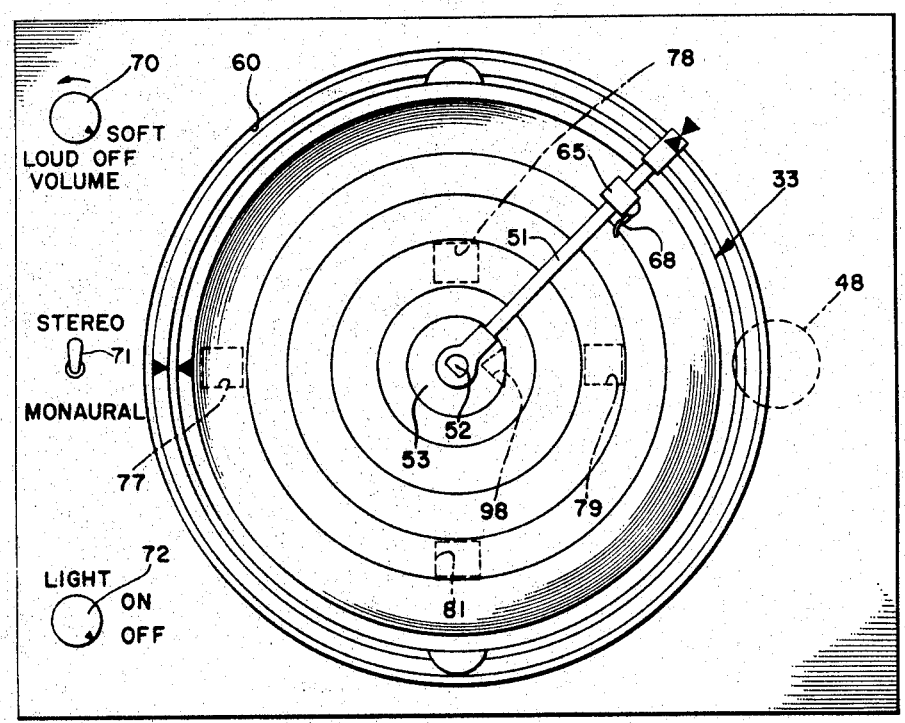
FIG. 4 is a schematic plan view of the panel in the well at the upper part of the cabinet and the sound side of the record.

FIG. 4 is a plan view of the record and the control panel adjacent to the well 32. Numeral 70 designates a conventional control and volume switch for the sound part of the apparatus. Numeral 71 designates a switch whereby the sound may be switched from Monaural to Stereo if this type of equipment is provided. Numeral 72 designates a switch controlling the lights, record motor and blower.

The bottom wall 74 of the well 32 in FIG. 3 has, provided in it a group of five openings or windows as designated in FIG. 4 at 77, 78, 79, and 81 and 98 associated with each of these windows is a projection lamp housing as designated, for example, at 84 in FIGURE 3 having a lamp 85 within it and also a reflector and condensing lens systems, if necessary. The box 84 has a light aperture 86 whereby light may be projected through one of the windows such as a window 77 so as to illuminate images on the lower side of the record 33 which would be those forms, patterns, or images on the band 37 of FIG. 5. Numeral 87 designates an electrically operated shutter cooperating with the aperture 86 which shutter is controlled by a switch, preferably a microswitch 89 which is automatically operated by a projection 91 extending downwardly from the bottom of the record 33. The projection 91 may have any desired angular extent so as to keep the shutter 87 open or closed for a comparable number of angular degrees of travel. In other words, an image at a particular angular position on the band 37 may be illuminated and transmitted or a continuing progressive group of images can be allowed to be reflected and transmitted during a substantial number of degrees of angular travel.

Numeral 93 designates a focusing lens and numeral 94 designates a prism for deflecting the reflected light from the image on the lower side of the record 33 and transmitting this light to the display screen 14 in the manner described in connection with FIG. 2.

Associated with each of the windows 78, 79, and 81 is a similar lamp housing equipped with a similar shutter and operating in a similar manner so that the detailed operation of each of these need not be described in detail. Each is equipped with light deflecting means so that its respective image is transmitted to the display screen 14 and all of the transmitted images are superimposed thereon.

It should be observed that the images, patterns, or color forms, or the like on the bands 37, 38 and 39 and 40 continually progress or move past their respective windows as the record 33 rotates. It should be observed also that each moves past its respective window in a different direction. That is, considering that the record in FIG. 4 is moving in a clockwise direction, the images move past the window 77 in an upward direction. They move past the window 78 from left to right; they move past the window 79 in a downward direction and they move past the window 81 from right to left. It will be apparent therefore, that simultaneously, color forms, patterns, or images or the like may be simultaneously superimposed on the display screen 14 moving in four different directions as described. Innumerable and infinitely variable moving color images and effects can, thereby, be provided. In other words, as may be seen, progressive and changing color forms and patterns, may be provided on one of the bands on the record 33 with other coordinated or uncoordinated color patterns or forms on other bands which may provide either a background or foreground, with the images of different bands moving in different directions as desired. The projected images may, of course, be abstractions or actual pictures or photographs progressing across the screen in a direction depending upon which window and which band they are picked up from. Some of the bands may be black and reflect no light.

For cooling the operative parts and particularly for carrying off the heat from the lamps there is provided an air circulating blower as designated at 96 in FIG. 2 which withdraws air from the region and vicinity of the light boxes and discharges it from the cabinet 10.

From the foregoing it will be understood that projections such as 91 are provided for operating micro-switches controlling the shutters for each of the light boxes so that any desired program or schedule of illuminating and reflecting the images from particular selected bands on the bottom of the record 33 may be provided for. For example, images may be picked off only at selected intermittent intervals when a particular shutter is opened or images may be continuously and progressively picked off from a band while the record rotates with its respective shutter being kept open. By designing the images on various bands appropriately and by programing the opening and closing of the shutter animated effects may be achieved.

In addition to the lamp housings as described, there is provided an additional one as designated at 97 associated with the innermost band 41 and its respective window 98. Associated with this particular window is a kaleidoscopic mirror box as designated at 99 having a similar cooperating focusing lens for transmitting images to the display screen 14. By means of this arrangement a kaleidoscopic pattern can be reproduced on the screen whenever desired by use of this particular window and its associated projection light and shutter.

From the introductory description describing the general nature of the inventioin, and the specific embodiment that has now been described in detail those skilled in the art will recognize and appreciate the novelty and originality of the invention and its manifold possibilities for entertainment and education as a new art form, and as a color or image interpretation of music or musical compositions. As may be seen, the moving forms, colors, color patterns, or other images reproduced on the screen from the rotating record may be coordinated or scored or otherwise related to the music that is playing, so as to be interpretive of it or otherwise illustrative of the theme of the music. Patterns produced may be simply colors or color forms, the mechanisms being ideally adapted for their progressive or continuous movement in various directions so that, as pointed out innumerable and in fact infinite variations may be provided in form, shape, pattern, movement, and color of image displayed. The records or record and pattern wheels are, of course, interchangeable. The invention makes possible the composing and reproducing of color concerts to be enjoyed privately or by the public in general. The apparatus as described herein is relatively simple, may be produced inexpensively and requires virtually no skill to operate and may be enjoyed by anyone.

Those skilled in the art will, at once, observe many additional advantages, possibilities and aspects of the invention which are obvious from its nature although not necessarily specifically referred to in the foregoing. The arrangement as described above may be made very compact, yet even with relatively small images on the record they can be greatly magnified to produce relatively larger images for viewing on the screen. Of course, if desired, only the images from a single track may be projected at one time simply by opening only that particular shutter or by, for example, having the other tracks or bands painted black in those areas or angular spaces. Very striking effects can be produced by superimposing combinations of different patterns on the screen simultaneously, particularly with these patterns moving or progressing in different directions at the same time. Further striking effects can be produced by organizing the arrangement of the image track to produce particular sequences either in a single direction or in different directions simultaneously. The fact of these variations and combinations being innumerable and in fact infinite makes it possible to score, compose, orient, or coordinate the visual images with the music so that, in effect, the music is illustrated visually. Talented musical composers also having some skill in the optical field no doubt, by means of this art form, would be able to produce visual music which would be as entertaining to deaf people as sound music is to those who can hear.

It should be understood that the color player part of the invention may, of course, be made separately and the color patterns displayed alone, or it may be combined with regular sound reproducing equipment such as a hi-fi player. Standard phonograph records may be used for the sound and the color reproduced from color records which may have patterns on both sides scored to complement the music of the sound record. Synchronism may be achieved by means for turning the color player and phonograph on and off in unison. In the specific embodiment described herein, as will be observed in FIG. 4 plainly indicated indicia markers are provided for indicating the starting point of the record with respect to the platform as well as for indicating the starting point of the tone arm.

A fixed rather than an interchangeable record might be used, for example, in advertising equipment. Variations may also be made in specific construction and arrangement of parts of the equipment without departing from the principle and spirit of the invention. For example, conceivably it might be desirable to have the light source on one side of a transparent record and project through it. Various means can also be utilized for programing the record as to the images that are projected onto screen in sequence, etc. It is, of course, possible to also practice the art form utilizing only a single projection lamp or without even using any lamps but simply using natural light. It is possible also that the art form may be practiced by means other than a circular record, such as a tape, card, film or cylinder.

While the instant invention has been shown and described herein in what is conceived to be the most practical and preferred embodiment, it is recognized that departures may be made therefrom within the scope of the invention which is therefore not to be limited to the details disclosed herein but is to be afforded the full scope of the claims.

What is claimed is:

1. Picture-sound projector, comprising:
    an interchangeable, movable member having sound recording means on one portion and a plurality of images on another portion,
    means for moving said member,
    second means for progressively projecting said plurality of images for super positioning upon a screen and for traversing the screen in different directions, and
    means for deriving sound from said sound recording means, synchronized with said projecting means.

2. Projector in accordance with claim 1, including additionally:
    means automatically operable by said movable member for selectively controlling the projection of images on said screen.

3. Projector in accordance with claim 1, wherein:
    said movable member is rotatably mounted,
    said sound deriving means comprises rotatable sound pick-up means mounted coaxially of said member, and including,
    means for rotating said movable member at a given angular speed for image projection purposes, and
    means for rotating said sound pick-up means at a higher speed for sound reproduction purposes.

4. Picture-sound projector, comprising:
    an interchangeable disc having on one face thereof a plurality of concentrically positioned continuous images, and having on the other face a sound recording track,
    means for rotating said disc,
    optical pick-up means for sensing said images and projecting same on a screen in the form of continuously-moving images continuously traversing the screen,
    sound pick-up means for sensing from said disc the sound recorded thereon and reproducing said sound in synchronism with the moving images,
    control means on said disc, and
    pick-up means responsive to said control means for effecting selected projection or blocking of certain portions of said images.

(References on following page)

References Cited

UNITED STATES PATENTS

| | | | |
|---|---|---|---|
| 1,479,794 | 1/1924 | Emerson | 35—1 |
| 1,913,913 | 6/1933 | Boularan et al. | 352—26 |
| 2,005,914 | 6/1935 | Freund | 352—26 |
| 2,455,712 | 12/1948 | Soden | 352—26 |
| 2,546,054 | 3/1951 | Aldrich et al. | 88—27 |
| 2,587,433 | 2/1952 | Bentley et al. | 88—27 |
| 2,677,297 | 5/1954 | Wetzel | 84—464 |
| 3,191,494 | 6/1965 | Schwartz et al. | 88—28 |

FOREIGN PATENTS 1,161,641   3/1958   France.

NORTON ANSHER, *Primary Examiner.*

W. MISIEK, *Examiner.*

W. M. FRYE, V. A. SMITH, H. H. FLANDERS,
*Assistant Examiners.*